(12) United States Patent
Geng et al.

(10) Patent No.: US 11,356,930 B2
(45) Date of Patent: Jun. 7, 2022

(54) SYSTEM INFORMATION UPDATE METHOD AND APPARATUS

(71) Applicant: Huawei Technologies Co., Ltd., Shenzhen (CN)

(72) Inventors: Tingting Geng, Shanghai (CN); Yalin Liu, Shenzhen (CN); Qinghai Zeng, Shanghai (CN); Chong Lou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 123 days.

(21) Appl. No.: 16/403,126

(22) Filed: May 3, 2019

(65) Prior Publication Data

US 2019/0261257 A1 Aug. 22, 2019

Related U.S. Application Data

(63) Continuation of application No. PCT/CN2017/109384, filed on Nov. 3, 2017.

(30) Foreign Application Priority Data

Nov. 4, 2016 (CN) .......................... 201610981660.1

(51) Int. Cl.
*H04W 48/14* (2009.01)
*H04W 76/11* (2018.01)
(Continued)

(52) U.S. Cl.
CPC ........... *H04W 48/14* (2013.01); *H04W 48/12* (2013.01); *H04W 48/16* (2013.01);
(Continued)

(58) Field of Classification Search
CPC ..... H04W 48/14; H04W 76/11; H04W 48/12; H04W 48/16; H04W 52/146; H04W 52/36
See application file for complete search history.

(56) References Cited

U.S. PATENT DOCUMENTS

| 2011/0116433 A1* | 5/2011 | Dorenbosch | ........ H04W 72/005 370/312 |
| 2011/0171979 A1* | 7/2011 | Rune | ..................... H04W 24/02 455/458 |

(Continued)

FOREIGN PATENT DOCUMENTS

| CN | 101557617 A | 10/2009 |
| CN | 101902799 A | 12/2010 |

(Continued)

OTHER PUBLICATIONS

Catt, "System Information Area," R2-164809, 3GPP TSG RAN WG2 Meeting #95, Gothenburg, Sweden, Aug. 22-26, 2016, 6 pages.

(Continued)

*Primary Examiner* — Michael Thier
*Assistant Examiner* — Nevena Zecevic Sandhu
(74) *Attorney, Agent, or Firm* — Slater Matsil, LLP (57) ABSTRACT

A system information update method and apparatus are provided. The method includes: receiving, by a terminal, indication information and an area identifier from a first network device, where the indication information indicates whether system information of the area is the same; and determining, by the terminal based on the indication information and/or the area identifier, whether to update the system information.

20 Claims, 4 Drawing Sheets

(51) Int. Cl.
*H04W 48/16* (2009.01)
*H04W 52/14* (2009.01)
*H04W 52/36* (2009.01)
*H04W 48/12* (2009.01)

(52) U.S. Cl.
CPC ......... *H04W 52/146* (2013.01); *H04W 52/36* (2013.01); *H04W 76/11* (2018.02)

(56) References Cited

U.S. PATENT DOCUMENTS

| | | | | |
|---|---|---|---|---|
| 2012/0320842 | A1* | 12/2012 | Jeong | H04W 74/006 370/329 |
| 2016/0219504 | A1* | 7/2016 | Cho | H04W 48/16 |
| 2017/0134124 | A1* | 5/2017 | Lee | H04L 1/08 |
| 2018/0049244 | A1* | 2/2018 | Lee | H04W 76/27 |
| 2019/0191292 | A1* | 6/2019 | Breuer | H04W 48/16 |
| 2019/0223094 | A1* | 7/2019 | Ingale | H04W 68/005 |

FOREIGN PATENT DOCUMENTS

| | | |
|---|---|---|
| CN | 102104854 A | 6/2011 |
| KR | 20070034021 A | 3/2007 |

OTHER PUBLICATIONS

Gemalto N.V, "System Information for NR including ID and version tag," R2-166132, 3GPP TSG-RAN WG2 #95bis, Kaohsiung, Taiwan, Oct. 10-14, 2016, 4 pages.
Institute for Information Industry (III), "Discussion on System Information Delivery in NR," R1-1610207, GPP TSG RAN WG1 Meeting #86bis, Lisbon, Portugal Oct. 10-14, 2016, 6 pages.
Interdigital Communications, "System Information Acquisition for New Radio Access", 3GPP TSG-RAN WG2 #94, Tdoc R2-164088, Nanjing, China, May 23-27, 2016, 5 pages.
Catt, "NR cell for idle state", 3GPP TSG-RAN WG2 Meeting #95bis, R2-166125, Kaohsiung, Oct. 10-4, 2016, 6 pages.
Huawei, Hisilicon, "RRC based mobility", 3GPP TSG-RAN2 Meeting #95bis, R2-166999, Kaohsiung, Oct. 10-14, 2016, 3 pages.

* cited by examiner

SYSTEM INFORMATION UPDATE METHOD AND APPARATUS

CROSS-REFERENCE TO RELATED APPLICATIONS

This application is a continuation of International Application No. PCT/CN2017/109384, filed on Nov. 3, 2017, which claims priority to Chinese Patent Application No. 201610981660.1, filed on Nov. 4, 2016. The disclosures of the aforementioned applications are hereby incorporated by reference in their entireties.

TECHNICAL FIELD

This application relates to the field of communications technologies, and in particular, to a system information update method and apparatus.

BACKGROUND

In an existing communications system, for example, a long term evolution (LTE) system, a cell has a unique physical cell identifier (PCI), and system information parameters in the cell are the same. A cell (also referred to as a hyper cell) in a new radio (NR) and a future wireless system includes a plurality of transmission reception points (TRP). The plurality of TRPs may have a same physical cell identifier (PCI), and all the TRPs transmit same information, such as system information (SI), access control information, maximum transmit power of the TRPs, and a terminal power ramp parameter. This imposes a high requirement on content transmitted by each TRP in a network. Especially, all content of broadcast messages needs to be consistent.

In actual deployment, there may be a very complex deployment scenario. For example, in a scenario in which a cell or a hyper cell has both a macro base station and a small cell or a pico (the macro base station, the small cell, and the pico may be collectively referred to as TRPs), system information transmitted by different TRPs may be different, for example, maximum transmit power of the macro base station and that of the small cell may be different, and TPRs at different locations have different load and corresponding access control parameters are different. If the entire cell or hyper cell uses one PCI, and different TRPs transmit different system information, for a terminal that moves in the cell or the hyper cell and is in an inactive or idle state, because the terminal does not know that different TRPs transmit different system information, the terminal cannot update system information in a timely manner. As a result, the terminal may not update, in a timely manner, maximum transmit power of a TRP on which the terminal currently resides, and final transmit power is excessively large or small, thereby increasing system interference or reducing a success rate of initial network access.

In conclusion, when different TRPs transmit different system information in a cell or a hyper cell, a problem that a terminal cannot update system information in a timely manner needs to be resolved urgently.

SUMMARY

Embodiments of this application provide a system information update method and apparatus, so that a terminal updates system information in a timely manner, thereby increasing a success rate of initially accessing a network by the terminal.

According to a first aspect, an embodiment of this application provides a system information update method, including: receiving, by a terminal, indication information sent by a first network device, where the indication information indicates whether system information of a hyper cell in which the first network device is located is the same; and determining, by the terminal based on the indication information, whether to update the system information.

According to the method provided in this embodiment of this application, the indication information that is sent by the first network device and that is received by the terminal is used to indicate whether the system information of the hyper cell in which the first network device is located is the same. Therefore, the terminal can determine, based on the indication information, whether to update the system information. For a scenario in which there is at least one piece of system information in one hyper cell, the terminal may update the system information in a timely manner based on the indication information, so as to increase a success rate of initially accessing a network by the terminal.

Optionally, the determining, by the terminal based on the indication information, whether to update the system information includes: when the terminal determines, based on the indication information, that the system information of the hyper cell in which the first network device is located is the same, updating the system information if determining that a hyper cell identifier is changed.

Optionally, the hyper cell in which the first network device is located includes at least one grouping area, and the indication information indicates whether system information of all grouping areas of the hyper cell is the same; and the method further includes: when the terminal determines, based on the indication information, that the system information of all the grouping areas of the hyper cell is different, updating the system information if determining that a grouping area in which the terminal is located is changed.

Optionally, each grouping area is corresponding to at least one physical cell identifier PCI or reference signal RS; and the updating the system information if determining that a grouping area in which the terminal is located is changed includes: after the terminal moves from a first location to a second location, obtaining a PCI or an RS, and if determining that the PCI or the RS does not belong to a first grouping area in which the first location is located, determining that the grouping area in which the terminal is located is changed, and using system information of a second grouping area in which the second location is located as updated system information, or using system information mapped to a PCI or an RS corresponding to the second grouping area as updated system information; or after the terminal moves from a first location to a second location, receiving a second grouping area identifier sent by a network device in a second grouping area in which the second location is located, and if determining that the received second grouping area identifier is different from a stored first grouping area identifier of a first area in which the first location is located, determining that the grouping area in which the terminal is located is changed, and using system information sent by the network device in the second grouping area corresponding to the received second grouping area identifier as updated system information, where a grouping area identifier uniquely identifies one grouping area in the hyper cell.

Optionally, when the hyper cell includes a network device that sends at least one beam, the indication information indicates whether system information of all beams is the same; and the method further includes: when the terminal determines, based on the indication information, that the system information of all the beams is different, updating the system information if determining that a received beam is changed.

Optionally, the system information includes one or more of the following: maximum transmit power of the terminal; initial receive power of a preamble received by an access network device; a power ramp step of sending an initial access preamble by the terminal; a maximum quantity of times of retransmitting a preamble by the terminal; and an access control parameter.

According to a second aspect, an embodiment of this application provides a system information update method, including: generating, by a first network device, indication information, where the indication information indicates whether system information of a hyper cell in which the first network device is located is the same; and sending, by the first network device, the indication information to a terminal.

According to the method provided in this embodiment of this application, the first network device may send the indication information to the terminal to indicate, to the terminal, whether the system information of the hyper cell in which the first network device is located is the same, so that the terminal can determine, based on the indication information, whether to update the system information, thereby increasing a success rate of initially accessing a network by the terminal.

Optionally, the hyper cell includes at least one grouping area, and the grouping area includes at least one physical cell identifier PCI or reference signal RS; and the indication information indicates whether system information of all grouping areas of the hyper cell is the same.

Optionally, when the hyper cell includes a network device that sends at least one beam, the indication information indicates whether system information of all beams is the same.

Optionally, the method further includes: sending, by the first network device, a system parameter to a second network device, and receiving the system information generated by the second network device based on the system parameter; or generating, by the first network device, the system information based on the system parameter, and sending the system information to the second network device.

Optionally, the system parameter includes one or more of the following: a power control parameter of the first network device; system load of the first network device; physical resource block utilization of the first network device; and channel quality feedback received by the first network device.

According to a third aspect, an embodiment of this application provides a system information update apparatus, including: a transceiver unit, configured to receive indication information sent by a first network device, where the indication information indicates whether system information of a hyper cell in which the first network device is located is the same; and a processing unit, configured to determine, based on the indication information, whether to update the system information.

Optionally, the processing unit is specifically configured to: when determining, based on the indication information, that the system information of the hyper cell in which the first network device is located is the same, update the system information if determining that a hyper cell identifier is changed.

Optionally, the hyper cell in which the first network device is located includes at least one grouping area, and the indication information indicates whether system information of all grouping areas of the hyper cell is the same; and the processing unit is further configured to: when determining, based on the indication information, that the system information of all the grouping areas of the hyper cell is different, update the system information if determining that a grouping area in which the terminal is located is changed.

Optionally, each grouping area is corresponding to at least one physical cell identifier PCI or reference signal RS; and the processing unit is specifically configured to: after the terminal moves from a first location to a second location, obtain a PCI or an RS, and if determining that the PCI or the RS does not belong to a first grouping area in which the first location is located, determine that the grouping area in which the terminal is located is changed, and use system information of a second grouping area in which the second location is located as updated system information, or use system information mapped to a PCI or an RS corresponding to the second grouping area as updated system information; or after the terminal moves from a first location to a second location, receive a second grouping area identifier sent by a network device in a second grouping area in which the second location is located, and if determining that the received second grouping area identifier is different from a stored first grouping area identifier of a first area in which the first location is located, determine that the grouping area in which the terminal is located is changed, and use system information sent by the network device in the second grouping area corresponding to the received second grouping area identifier as updated system information, where a grouping area identifier uniquely identifies one grouping area in the hyper cell.

Optionally, when the hyper cell includes a network device that sends at least one beam, the indication information indicates whether system information of all beams is the same; and the processing unit is further configured to: when determining, based on the indication information, that the system information of all the beams is different, update the system information if determining that a received beam is changed.

Optionally, the system information includes one or more of the following: maximum transmit power of the terminal; initial receive power of a preamble received by an access network device; a power ramp step of sending an initial access preamble by the terminal; a maximum quantity of times of retransmitting a preamble by the terminal; and an access control parameter.

According to a fourth aspect, an embodiment of this application provides a system information update apparatus, including: a processing unit, configured to generate indication information, where the indication information indicates whether system information of a hyper cell in which a first network device is located is the same; and a transceiver unit, configured to send the indication information to a terminal.

Optionally, the hyper cell includes at least one grouping area, and the grouping area includes at least one physical cell identifier PCI or reference signal RS; and the indication information indicates whether system information of all grouping areas of the hyper cell is the same.

Optionally, when the hyper cell includes a network device that sends at least one beam, the indication information indicates whether system information of all beams is the same.

Optionally, the transceiver unit is further configured to: send a system parameter to a second network device, and receive the system information generated by the second network device based on the system parameter; or generate the system information based on the system parameter, and send the system information to the second network device.

Optionally, the system parameter includes one or more of the following: a power control parameter of the first network device; system load of the first network device; physical resource block utilization of the first network device; and channel quality feedback received by the first network device.

According to a fifth aspect, an embodiment of this application provides a system information update apparatus, including: a transceiver, configured to receive indication information sent by a first network device, where the indication information indicates whether system information of a hyper cell in which the first network device is located is the same; and a processor, configured to determine, based on the indication information, whether to update the system information.

Optionally, the processor is specifically configured to: when determining, based on the indication information, that the system information of the hyper cell in which the first network device is located is the same, update the system information if determining that a hyper cell identifier is changed.

Optionally, the hyper cell in which the first network device is located includes at least one grouping area, and the indication information indicates whether system information of all grouping areas of the hyper cell is the same; and the processor is further configured to: when determining, based on the indication information, that the system information of all the grouping areas of the hyper cell is different, update the system information if determining that a grouping area in which the terminal is located is changed.

Optionally, each grouping area is corresponding to at least one physical cell identifier PCI or reference signal RS; and the processor is specifically configured to: after the terminal moves from a first location to a second location, obtain a PCI or an RS, and if determining that the PCI or the RS does not belong to a first grouping area in which the first location is located, determine that the grouping area in which the terminal is located is changed, and use system information of a second grouping area in which the second location is located as updated system information, or use system information mapped to a PCI or an RS corresponding to the second grouping area as updated system information; or after the terminal moves from a first location to a second location, receive a second grouping area identifier sent by a network device in a second grouping area in which the second location is located, and if determining that the received second grouping area identifier is different from a stored first grouping area identifier of a first area in which the first location is located, determine that the grouping area in which the terminal is located is changed, and use system information sent by the network device in the second grouping area corresponding to the received second grouping area identifier as updated system information, where a grouping area identifier uniquely identifies one grouping area in the hyper cell.

Optionally, when the hyper cell includes a network device that sends at least one beam, the indication information indicates whether system information of all beams is the same; and the processor is further configured to: when determining, based on the indication information, that the system information of all the beams is different, update the system information if determining that a received beam is changed.

Optionally, the system information includes one or more of the following: maximum transmit power of the terminal; initial receive power of a preamble received by an access network device; a power ramp step of sending an initial access preamble by the terminal; a maximum quantity of times of retransmitting a preamble by the terminal; and an access control parameter.

According to a sixth aspect, an embodiment of this application provides a system information update apparatus, including: a processor, configured to generate indication information, where the indication information indicates whether system information of a hyper cell in which a first network device is located is the same; and a transceiver, configured to send the indication information to a terminal.

Optionally, the hyper cell includes at least one grouping area, and the grouping area includes at least one physical cell identifier PCI or reference signal RS; and the indication information indicates whether system information of all grouping areas of the hyper cell is the same.

Optionally, when the hyper cell includes a network device that sends at least one beam, the indication information indicates whether system information of all beams is the same.

Optionally, the transceiver is further configured to: send a system parameter to a second network device, and receive the system information generated by the second network device based on the system parameter; or generate the system information based on the system parameter, and send the system information to the second network device.

Optionally, the system parameter includes one or more of the following: a power control parameter of the first network device; system load of the first network device; physical resource block utilization of the first network device; and channel quality feedback received by the first network device.

An embodiment of this application provides a computer readable storage medium. The computer readable storage medium stores a computer readable instruction, and when a computer reads and executes the computer readable instruction, the computer performs the method in any one of the foregoing aspects or the possible designs of the foregoing aspects.

An embodiment of this application provides a computer program product. When a computer reads and executes the computer program product, the computer performs the method in any one of the foregoing aspects or the possible designs of the foregoing aspects.

An embodiment of this application provides a chip. The chip is connected to a memory, and is configured to read and execute a software program stored in the memory, so as to implement the method in any one of the foregoing aspects or the possible designs of the foregoing aspects.

DETAILED DESCRIPTION OF ILLUSTRATIVE EMBODIMENTS

Embodiments of this application may be applied to various communications systems, such as a global system for mobile communications (GSM), a code division multiple access (CDMA) system, a wideband code division multiple access (WCDMA) system, a general packet radio service (GPRS) system, a long term evolution (LTE) system, a long term evolution advanced (LTE-A) system, a universal mobile telecommunications system (UMTS), a 5G system, and other mobile systems.

Some terms in this application are explained and described below for ease of understanding by a person skilled in the art.

(1) A terminal, also referred to as user equipment (UE), is a device that provides a user with voice and/or data connectivity, for example, a handheld device having a wireless connection function or an in-vehicle device. For example, a common terminal includes a mobile phone, a tablet computer, a notebook computer, a palmtop computer, a mobile internet device (MID), and a wearable device such as a smartwatch, a smart band, and a pedometer.

(2) A network device may be a common base station (for example, NodeB or eNB), or a new radio controller (NR controller), or a centralized unit, or a New Radio NodeB (gNB), or a remote radio unit, or a micro base station (pico), or a relay (relay), or a distributed unit, or a transmission reception point (TRP) or a transmission point (TP), or a DU and TP/TRP, or any other wireless access device. However, the embodiments of the present invention are not limited thereto.

Figure 1:
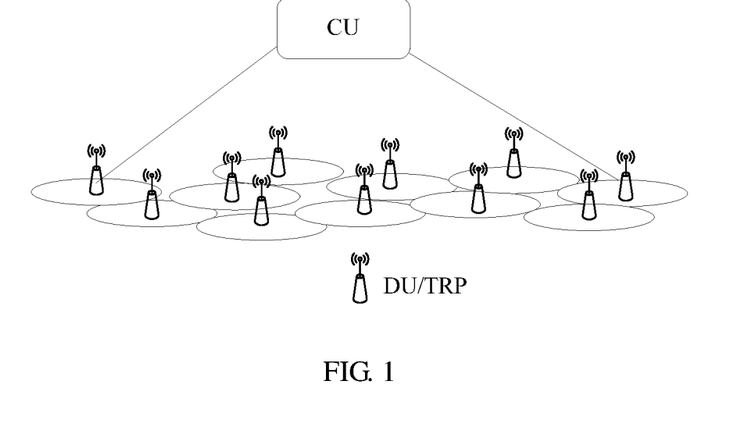
FIG. 1 is a schematic diagram of a network architecture applicable to an embodiment of this application.

The embodiments of this application are applicable to a 4G (fourth-generation mobile communications system) evolved system, for example, an LTE (Long Term Evolution) system or a 5G (fifth-generation mobile communications system) system, for example, a communications network such as an access network that uses a new radio access technology (New RAT). FIG. 1 is a schematic diagram of a network architecture applicable to an embodiment of this application.

In FIG. 1, there are one or more cells (or referred to as hyper cells) in a service area, one cell or one hyper cell includes one or more DUs and/or TRPs, and one DU includes one or more TRPs. System information (SI) of all cells or DUs or TRPs in one service area or one hyper cell may be the same, or partially the same, or totally different. In addition, one service area or one hyper cell may be associated with one or more physical cell identifiers (PCI) or downlink reference signals (RS), and different SI may be configured for different PCIs or RSs.

In a high-frequency scenario, one or more beams may further exist on each DU or TRP. Each network device may further provide different slices according to service types. Therefore, a granularity of SI may be further divided into a beam level or a slice level.

Figure 2:
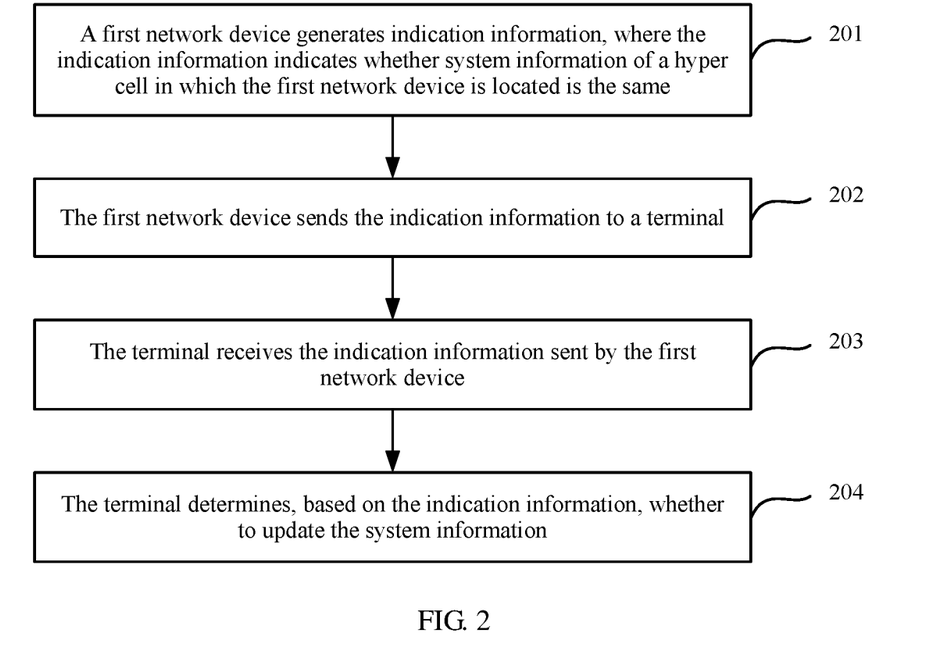
FIG. 2 is a schematic flowchart of a system information update method according to an embodiment of this application.

Based on the foregoing description, FIG. 2 is a schematic flowchart of a system information update method according to an embodiment of this application.

Referring to FIG. 2, the method includes the following steps.

Step 201: A first network device generates indication information, where the indication information indicates whether system information of a hyper cell in which the first network device is located is the same.

The hyper cell includes at least one network device.

The indication information may be an implicit indication, or may be an explicit indication. For example, the implicit indication means that when the indication information does not exist, the system information of the hyper cell is the same or different by default. The explicit indication directly indicates, by using indication information that exists explicitly, whether the system information of the hyper cell is the same.

The first network device is configured to broadcast information such as system information to a terminal, and the first network device includes but is not limited to a device such as a distributed unit (DU) and a transmission reception point (TRP).

It should be noted that, in this embodiment of this application, in a feasible implementation, the first network device, a second network device, and the network device are different concepts. The network device is not a generic concept of the first network device and the second network device.

In this embodiment of this application, the system information may include one master information block (MIB) and at least one system information block (SIB). Alternatively, the system information may include minimum system information (Minimum SI) and other system information (Other SI). The minimum system information is basic information necessary for UE to access a cell, and needs to be periodically broadcast. System information other than the minimum system information is sent by using the other system information.

Step 202: The first network device sends the indication information to a terminal.

Step 203: The terminal receives the indication information sent by the first network device.

Step 204: The terminal determines, based on the indication information, whether to update the system information.

In step 201, before the first network device generates the indication information, the second network device may first notify the first network device whether the system information of the hyper cell is the same, and then the first network device generates the indication information. Optionally, the first network device may also autonomously determine whether the system information of the hyper cell is the same. For example, within coverage or a service range of the first network device, if system information of all beams or slices of the first network device is different, the first network device can determine that the system information of a service area or a hyper cell indicated by the area is different, and may directly generate the indication information.

In this embodiment of this application, based on different ranges indicated by the indication information, the indication information may indicate whether system information in the different ranges are the same. For example, a range indicated by the indication information may be a service area or the hyper cell in which the first network device is located, or based on different network device architectures, a range indicated by the indication information may be a grouping area in a service area or a hyper cell, or a range indicated by the indication information may be represented by a beam or a slice. Therefore, the indication information may indicate whether the system information of the service area or the hyper cell in which the first network device is located is the same. When the service area or the hyper cell includes at least one grouping area, where each grouping area includes at least one network device or each grouping area is corresponding to at least one PCI or RS, the indication information may further indicate whether system information of all grouping areas of the service area or the hyper cell is the same. The network device in each grouping area may be a DU or a TRP.

Further, when the first network device sends at least one beam, the indication information may further indicate whether system information of the at least one beams is the same.

Further, when the network device includes at least one slice service, the indication information may further indicate whether system information of all slices is the same.

In step 202, the first network device may broadcast the indication information by using system information, to send the indication information to the terminal, for example, send the indication information to the terminal by using minimum system information. Certainly, the first network device may further send the indication information to the terminal in another manner. Details are not described herein.

In this embodiment of this application, the first network device may further determine the system information in any one of the following manners:

Manner 1: The first network device sends a system parameter to the second network device, and receives the system information sent by the second network device. It can be understood that the system information sent by the second network device may be generated based on the system parameter sent by the first network device.

It should be noted that a specific implementation of generating the system information by the second network device based on the system parameter is not limited in this embodiment of this application.

Manner 2: The first network device generates the system information, and sends the system information to the second network device. It can be understood that the first network device may generate the system information based on a system parameter obtained through statistics collection by the first network device.

It should be noted that a specific implementation of generating the system information by the first network device based on the system parameter is not limited in this embodiment of this application.

Manner 3: The first network device receives the system information sent by the second network device. It can be understood that the second network device may generate the system information according to a network policy of the second network device. The network policy may include but is not limited to any one of the following: system load of each first network device in a service area or a hyper cell corresponding to the second network device, and physical resource block utilization of each first network device in the service area or the hyper cell corresponding to the second network device.

In an embodiment, the second network device may be a management unit of the first network device. For example, the second network device may be a CU or a base station, and the first network device may be a DU or a TRP. Alternatively, the second network device may be a controller, and the first network device may be a base station.

It should be noted that, in this embodiment of this application, the system parameter may include one or more of the following: a power control parameter of the first network device; system load of the first network device; physical resource block utilization of the first network device; and channel quality feedback received by the first network device.

It should be further noted that, in this embodiment of this application, the system information may include one or more of the following: maximum transmit power of the terminal; initial receive power of a preamble received by an access network device; a power ramp step of sending an initial access preamble by the terminal; a maximum quantity of times of retransmitting a preamble by the terminal; and an access control parameter, where the access control parameter may enable the terminal to determine, before initiating random access to the first network device, whether the first network device allows the terminal to initiate the random access.

The first network device may directly send, to the terminal by using the system information, parameters such as the maximum transmit power of the terminal, the initial receive power of a preamble received by an access network device, the power ramp step of sending an initial access preamble by the terminal, the maximum quantity of times of retransmitting a preamble by the terminal, and the access control parameter. Optionally, the terminal may further establish a mapping relationship between a PCI or an RS and the foregoing parameters. After determining the PCI or the RS, the terminal may determine the foregoing parameters based on the mapping relationship.

After the terminal receives the indication information sent by the first network device in step 203, the terminal may determine, based on the indication information, whether to update the system information in step 204.

With reference to the foregoing description, the following describes in detail how the terminal updates the system information based on the indication information.

It can be understood that the terminal needs to determine whether an area in which the terminal is located is changed, so as to determine, based on the indication information, whether the system information needs to be updated.

In a feasible implementation, if the terminal moves from a first area to a second area, the terminal obtains information such as a first area identifier, a PCI list or an RS list corresponding to the first area, and indication information. After moving to the second area, the terminal determines, based on an obtained PCI or RS, that the terminal does not belong to the first area. The terminal obtains information such as a second area identifier, a PCI list or an RS list included in the second area, and indication information. The terminal uses obtained system information corresponding to the second area as updated system information, or uses system information mapped to the PCI or the RS as updated system information. Alternatively, the terminal determines, based on an obtained PCI or RS, that the terminal belongs to the first area. If the indication information indicates that system information of the first area is the same, the terminal does not need to update the system information. If the indication information indicates that system information of the first area is different, the terminal still needs to update the system information, or uses system information mapped to the PCI or the RS as updated system information. An area identifier uniquely identifies one area. The area identifier may be a service area identifier, a hyper cell identifier, a grouping area identifier, or the like.

Certainly, the PCI list or the RS list included in the foregoing area identifier and/or area may be preconfigured, or may be pre-negotiated between the network device and the terminal.

Optionally, in another feasible implementation, if the terminal moves from a first area to a second area, and the terminal receives a second area identifier sent by a network device in the second area and determines that the received second area identifier is different from a stored first area identifier, the terminal determines that the area in which the terminal is located is changed, and uses received system information sent by the network device in the second area as updated system information, or uses system information mapped to the PCI or the RS as updated system information. Alternatively, the terminal receives a second area identifier sent by the network device, determines that the received second area identifier is the same as a stored first area identifier, and determines that the second area belongs to the first area in which the terminal is located. If the indication information indicates that system information of the first area is the same, the terminal does not need to update the system information. If the indication information indicates that system information of the first area is different, the terminal still needs to update the system information, or uses system information mapped to the PCI or the RS as updated system information. An area identifier uniquely identifies one area.

The following describes different cases separately.

In a first possible implementation, the indication information indicates whether the system information of the service area or the hyper cell in which the first network device is located is the same.

In the implementation, when determining, based on the indication information, that the system information of the service area or the hyper cell in which the first network device is located is the same, the terminal updates the system information if determining that a service area identifier or a hyper cell identifier is changed. Correspondingly, if the terminal determines that the service area identifier or the hyper cell identifier is not changed, the terminal does not need to update the system information.

In addition, when determining, based on the indication information, that the system information of the service area or the hyper cell in which the first network device is located is different, and when determining that a received grouping area identifier, PCI or RS, beam, or slice in the service area or the hyper cell is changed, the terminal may update the system information.

In a second possible implementation, the service area or the hyper cell includes at least one grouping area. Each grouping area includes at least one cell, at least one transmission reception point TRP, or at least one beam. The indication information may indicate whether system information of all grouping areas of the service area or the hyper cell is the same. Each grouping area is corresponding to one grouping area identifier. The grouping area identifier uniquely identifies one grouping area in the service area or the hyper cell.

It can be understood that the network device needs to notify the terminal of a correspondence between a service area identifier or a hyper cell identifier and a grouping area identifier, and/or a correspondence between a grouping area identifier and a PCI or an RS. In this way, when obtaining a new grouping area identifier or PCI or RS, the terminal can determine whether the terminal is located in a previous service area, hyper cell, or grouping area, so as to determine whether the system information needs to be updated. Certainly, the foregoing correspondence may be preconfigured, or may be pre-negotiated between the network device and the terminal.

In this case, when determining, based on the indication information, that the system information of all grouping areas of the service area or the hyper cell is different, the terminal updates the system information if determining that a grouping area in which the terminal is located is changed.

Specifically, in an implementation, each network device broadcasts, in each cell included in the network device, a grouping area identifier of a grouping area to which each cell belongs, and each grouping area is corresponding to at least one PCI or RS. When the terminal determines, based on the indication information, that the system information of all the grouping areas of the service area or the hyper cell is different, and when the terminal moves, the terminal directly compares a received grouping area identifier with a stored grouping area identifier, to determine whether the grouping area identifier is changed. When determining that the grouping area identifier is changed, the terminal determines that the grouping area in which the terminal is located is changed, and further updates the system information. Specifically, after moving from a first location to a second location, the terminal receives a second grouping area identifier sent by a network device in a second grouping area in which the second location is located. If the terminal determines that the received second grouping area identifier is different from a stored first grouping area identifier of a first area in which the first location is located, the terminal determines that the grouping area in which the terminal is located is changed, and uses system information sent by the network device in the second grouping area corresponding to the received second grouping area identifier as updated system information, where a grouping area identifier uniquely identifies one grouping area in the hyper cell. Correspondingly, if the terminal determines that the received second grouping area identifier is the same as a stored first grouping area identifier of a first area in which the first location is located, the terminal determines that the grouping area in which the terminal is located is not changed, and does not update the system information.

For example, a grouping area 1 includes a cell 1 and a cell 2. A grouping area 2 includes a cell 3. A network device corresponding to the cell 1 and a network device corresponding to the cell 2 separately indicate to a terminal that a grouping area to which the network devices belong is the grouping area 1. For example, a grouping area identifier of the grouping area 1 may be broadcast in the cell 1 and the cell 2 in a broadcast manner. The terminal obtains the grouping area identifier of the grouping area 1 when the terminal is located in the cell 1. When moving from the cell 1 to the cell 2, the terminal also obtains the grouping area identifier of the grouping area 1 in the cell 2, and therefore determines that the grouping area in which the terminal is located is not changed. If the indication information indicates that system information in the grouping area is the same, the terminal does not need to update the system information; or otherwise, the terminal needs to update the system information. When the terminal moves to the cell 3, an obtained grouping area identifier is a grouping area identifier of the grouping area 2. Because the indication information indicates that system information of the grouping areas is different, when determining that the grouping area in which the terminal is located is changed, the terminal needs to update the system information to system information corresponding to the grouping area 2.

In another implementation, each network device broadcasts a PCI list or an RS list in each cell included in the network device. PCIs or RSs in the PCI list or the RS list belong to a same grouping area, in other words, one PCI list or one RS list is corresponding to one grouping area. Optionally, each PCI or RS may be mapped to one piece of system information. A mapping relationship between a PCI or an RS and system information may be preconfigured, and a specific configuration method is not limited. After moving from a first location to a second location, the terminal obtains a PCI or an RS. If the terminal determines that the PCI or the RS does not belong to a first grouping area in which the first location is located, the terminal determines that the grouping area in which the terminal is located is changed, and uses system information of a second grouping area in which the second location is located as updated system information, or uses system information mapped to a PCI or an RS corresponding to the second grouping area as updated system information. Correspondingly, if the terminal determines that the PCI or the RS belongs to a first grouping area in which the first location is located, the terminal determines that the grouping area in which the terminal is located is not changed.

The terminal may determine whether the PCI or the RS is in the PCI list or the RS list corresponding to the first grouping area in which the first location is located, to determine whether the PCI or the RS belongs to the first grouping area in which the first location is located. If the PCI or the RS is in the PCI list or the RS list corresponding to the first grouping area in which the first location is located, it is determined that the PCI or the RS belongs to the first grouping area in which the first location is located. If the PCI or the RS is not in the PCI list or the RS list corresponding to the first grouping area in which the first location is located, it is determined that the PCI or the RS does not belong to the first grouping area in which the first location is located.

For example, a grouping area 1 includes a PCI or an RS of a cell 1 and a PCI or an RS of a cell 2. A grouping area 2 includes a PCI or an RS of a cell 3. When the terminal is located in the cell 1, the terminal receives a PCI list or an RS list, obtains the PCI or the RS of the cell 1, and determines, based on a currently stored PCI or RS list, that the cell 1 belongs to the grouping area 1. When moving to the cell 2, the terminal obtains the PCI or the RS of the cell 2, and determines, based on the currently stored PCI or RS list, that the cell 2 belongs to the grouping area 1, so as to determine that the grouping area in which the terminal is located is not changed. If the indication information indicates that system information in the grouping area is the same, it is determined that the terminal does not need to update the system information; or otherwise, the terminal needs to update the system information. When moving to the cell 3, the terminal obtains the PCI or the RS of the cell 3, and determines, based on the currently stored PCI or RS list, that the cell 3 does not belong to the grouping area 1, so as to determine that the grouping area in which the terminal is located is changed. Because the current indication information indicates that system information of grouping areas is different, the terminal needs to update the system information to system information corresponding to the grouping area 2.

With reference to the foregoing description, after determining that the grouping area in which the terminal is located is changed, the terminal may obtain the PCI or the RS, and use system information mapped to the PCI or the RS as updated system information. Alternatively, after determining that the grouping area in which the terminal is located is changed, the terminal uses system information sent by a network device in a grouping area corresponding to a received grouping area identifier as updated system information.

In a third possible implementation, a range indicated by the area is represented by a beam, and the indication information may indicate whether system information of the at least one beams is the same. When the first network device sends at least one beam, the indication information indicates whether system information of the at least one beams is the same.

In the implementation, when determining, based on the indication information, that the system information of the at least one beams is different, the terminal updates the system information if the terminal determines that the received beam is changed. If the terminal determines that the received beam is not changed, the terminal does not update the system information.

In a fourth possible implementation, the network device includes at least one slice. The indication information indicates whether system information of all slices of all network devices is the same.

In the implementation, when determining, based on the indication information, that the system information of all the slices is different, the terminal updates the system information if determining that a slice is changed. If determining that a slice is not changed, the terminal does not update the system information. In addition, when determining, based on the indication information, that system information of all slices of all beams is the same, the terminal does not need to update the system information even if the terminal determines that a slice is changed.

Based on a network deployment requirement, a service area or a hyper cell may be divided into a plurality of tracking areas, and each tracking area may include one or more cells. Further, a plurality of tracking areas may be used as one tracking area group. When moving in a tracking area or a tracking area group, the terminal does not need to notify an access network device or a core network device of movement information of the terminal. However, when the terminal moves outside the tracking area or the tracking area group, the terminal needs to notify a network that the terminal moves out of a range configured for the network.

A specific notification manner may be that the terminal compares a newly read tracking area identifier and a previously configured tracking area identifier to determine whether the identifiers are the same. If determining that the identifiers are different, the terminal sends new tracking area information to the network. Specifically, the terminal may send the new tracking area information by using information in a random access process or by using radio resource control (RRC) signaling. Alternatively, the terminal sends an uplink tracking signal to notify the network device that the terminal enters a new tracking area. If the terminal does not receive an acknowledgement message from the network device because an uplink tracking signal previously configured by the terminal conflicts with configuration of the new tracking area, or if the terminal receives an acknowledgement message from the network device but cannot correctly descramble the acknowledgement message, the terminal may continue to send the uplink tracking signal until a maximum quantity of sending times is reached. If the terminal still does not receive an acknowledgement message from the network device, the terminal needs to re-access the network and then notify the network device that the terminal enters a new tracking area.

Each tracking area has one tracking area identifier uniquely corresponding to the tracking area, and a DU, a TRP, or a beam located in the tracking area sends the tracking area identifier in a broadcast manner. One DU, TRP, or beam may belong to different tracking areas at the same time. Therefore, one DU, TRP, or beam may simultaneously broadcast a plurality of tracking area identifiers. For example, a service area or a hyper cell may be divided based on a terminal type, so that the terminal may select a corresponding tracking area identifier based on a type of the terminal, and independently determine a tracking area change. The terminal type includes but is not limited to a terminal that supports Enhanced Mobile Broadband (eMBB), a terminal that supports massive machine type communication (mMTC), and a terminal that supports Ultra Reliable & Low Latency Communication (uRLLC).

Figure 3:
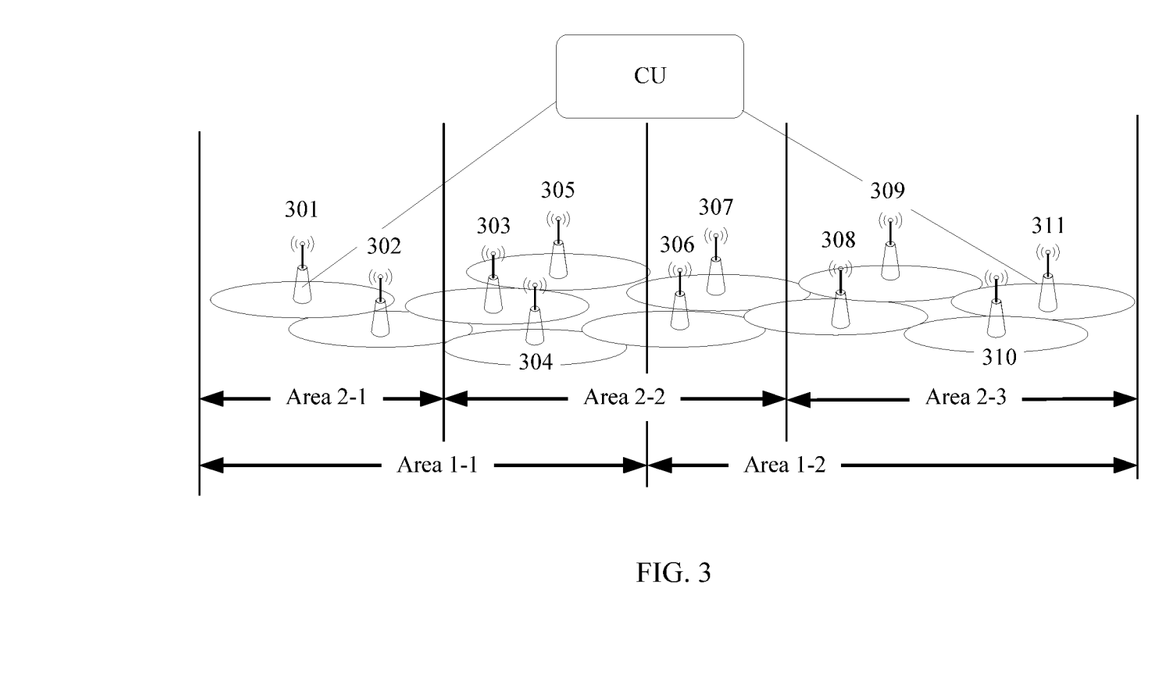
FIG. 3 is a schematic diagram of a network architecture according to an embodiment of this application.

For example, FIG. 3 is a schematic diagram of a network architecture according to an embodiment of this application. In FIG. 3, one CU is corresponding to one service area. The service area includes 11 DUs in total from a DU 301 to a DU 311. A network side divides the service area in two manners: In a first manner, the service area in FIG. 3 is divided into two specific areas (specific area): an area 1-1 and an area 1-2. The area 1-1 includes five DUs in total from the DU 301 to the DU 305. The area 1-2 includes six DUs in total from the DU 306 to the DU 311. The two areas obtained through division are corresponding to the terminal that supports eMBB.

In a second manner, the service area in FIG. 3 is divided into three specific areas: an area 2-1, an area 2-2, and an area 2-3. The area 2-1 includes two DUs in total from the DU 301 to the DU 302. The area 2-2 includes five DUs in total from the DU 303 to the DU 307. The area 2-3 includes four DUs in total from the DU 308 to the DU 311. The three areas obtained through division are corresponding to the terminal that supports mMTC.

In FIG. 3, the DU 301 and the DU 302 simultaneously broadcast an area identifier of the area 1-1 and an area identifier of the area 2-1. The DU 303 to the DU 305 simultaneously broadcast the area identifier of the area 1-1 and an area identifier of the area 2-2. The DU 306 and the DU 307 simultaneously broadcast an area identifier of the area 1-2 and the area identifier of the area 2-2. The DU 308 to the DU 311 simultaneously broadcast the area identifier of the area 1-2 and an area identifier of the area 2-3.

The terminal reads and stores a corresponding area identifier based on a service type supported by the terminal, and compares, in a moving process, a newly read area identifier with a stored area identifier to determine whether a change occurs. If a change occurs, the terminal needs to initiate a location update, and notify the network. For example, when the terminal that supports eMBB moves from the area 1-1 to the area 1-2, the terminal needs to initiate a location update, and notify the network of location information of the terminal. When the terminal that supports mMTC moves from the area 2-1 to the area 2-2, although the terminal is still located in the area 1-1, the terminal also needs to initiate a location update and notify the network of location information of the terminal. If the terminal supports a plurality of types, when an area corresponding to a type is changed, the terminal needs to update location information and notify the network. Similarly, if the terminal supports a plurality of service types or slice types, when the network divides a tracking area based on a service type or a slice type, and a tracking area corresponding to a corresponding service type is changed, the terminal needs to notify the network in a timely manner.

In addition, in an optional embodiment, the network device may alternatively send an area identifier and network device information corresponding to the area identifier. The terminal compares the network device information to determine whether the terminal moves out of a range of the area identifier. A correspondence between an area identifier and a network device may be configured by using dedicated signaling, or may be sent in a broadcast manner, or may be preconfigured or negotiated between the network device and the terminal.

Based on a same technical concept, an embodiment of this application further provides a system information update apparatus, and the apparatus may perform the foregoing method embodiment.

Figure 4:
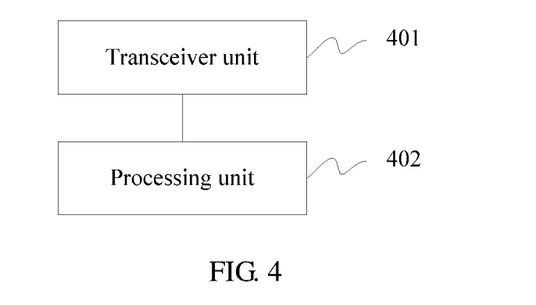
FIG. 4 is a schematic structural diagram of a system information update apparatus according to an embodiment of this application.

FIG. 4 is a schematic structural diagram of a system information update apparatus according to an embodiment of this application.

Referring to FIG. 4, the apparatus includes: a transceiver unit 401, configured to receive indication information sent by a first network device, where the indication information indicates whether system information of a hyper cell in which the first network device is located is the same; and a processing unit 402, configured to determine, based on the indication information, whether to update the system information.

Optionally, the processing unit 402 is specifically configured to: when determining, based on the indication information, that the system information of the hyper cell in which the first network device is located is the same, update the system information if determining that a hyper cell identifier is changed.

Optionally, the hyper cell in which the first network device is located includes at least one grouping area, and the indication information indicates whether system information of all grouping areas of the hyper cell is the same; and the processing unit 402 is further configured to: when determining, based on the indication information, that the system information of all the grouping areas of the hyper cell is different, update the system information if determining that a grouping area in which the terminal is located is changed.

Optionally, each grouping area is corresponding to at least one physical cell identifier PCI or reference signal RS; and the processing unit 402 is specifically configured to: after the terminal moves from a first location to a second location, obtain a PCI or an RS, and if determining that the PCI or the RS does not belong to a first grouping area in which the first location is located, determine that the grouping area in which the terminal is located is changed, and use system information of a second grouping area in which the second location is located as updated system information, or use system information mapped to a PCI or an RS corresponding to the second grouping area as updated system information; or after the terminal moves from a first location to a second location, receive a second grouping area identifier sent by a network device in a second grouping area in which the second location is located, and if determining that the received second grouping area identifier is different from a stored first grouping area identifier of a first area in which the first location is located, determine that the grouping area in which the terminal is located is changed, and use system information sent by the network device in the second grouping area corresponding to the received second grouping area identifier as updated system information, where a grouping area identifier uniquely identifies one grouping area in the hyper cell.

Optionally, when the hyper cell includes a network device that sends at least one beam, the indication information indicates whether system information of all beams is the same; and the processing unit 402 is further configured to: when determining, based on the indication information, that the system information of all the beams is different, update the system information if determining that a received beam is changed.

Optionally, the system information includes one or more of the following: maximum transmit power of the terminal; initial receive power of a preamble received by an access network device; a power ramp step of sending an initial access preamble by the terminal; a maximum quantity of times of retransmitting a preamble by the terminal; and an access control parameter.

Figure 5:
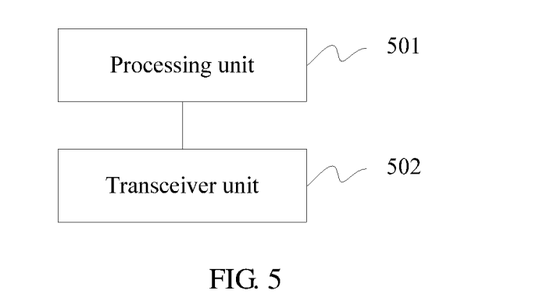
FIG. 5 is a schematic structural diagram of a system information update apparatus according to an embodiment of this application.

FIG. 5 is a schematic structural diagram of a system information update apparatus according to an embodiment of this application.

Referring to FIG. 5, the apparatus includes: a processing unit 501, configured to generate indication information, where the indication information indicates whether system information of a hyper cell in which a first network device is located is the same; and a transceiver unit 502, configured to send the indication information to a terminal.

Optionally, the hyper cell includes at least one grouping area, and the grouping area includes at least one physical cell identifier PCI or reference signal RS; and the indication information indicates whether system information of all grouping areas of the hyper cell is the same.

Optionally, when the hyper cell includes a network device that sends at least one beam, the indication information indicates whether system information of all beams is the same.

Optionally, the transceiver unit 502 is further configured to: send a system parameter to a second network device, and receive the system information generated by the second network device based on the system parameter; or generate the system information based on the system parameter, and send the system information to the second network device.

Optionally, the system parameter includes one or more of the following: a power control parameter of the first network device; system load of the first network device; physical resource block utilization of the first network device; and channel quality feedback received by the first network device.

Figure 6:
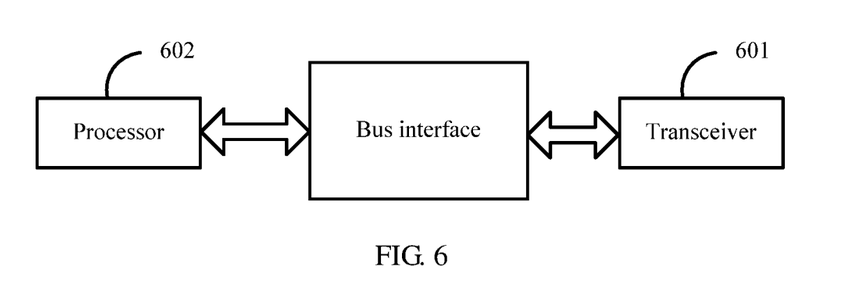
FIG. 6 is a schematic structural diagram of a system information update apparatus according to an embodiment of this application.

FIG. 6 is a schematic structural diagram of a system information update apparatus according to an embodiment of this application.

Referring to FIG. 6, the apparatus includes: a transceiver 601, configured to receive indication information sent by a first network device, where the indication information indicates whether system information of a hyper cell in which the first network device is located is the same; and a processor 602, configured to determine, based on the indication information, whether to update the system information.

Optionally, the processor 602 is specifically configured to: when determining, based on the indication information, that the system information of the hyper cell in which the first network device is located is the same, update the system information if determining that a hyper cell identifier is changed.

Optionally, the hyper cell in which the first network device is located includes at least one grouping area, and the indication information indicates whether system information of all grouping areas of the hyper cell is the same, and the processor is further configured to: when determining, based on the indication information, that the system information of all the grouping areas of the hyper cell is different, update the system information if determining that a grouping area in which the terminal is located is changed.

Optionally, each grouping area is corresponding to at least one physical cell identifier PCI or reference signal RS; and the processor 602 is specifically configured to: after the terminal moves from a first location to a second location, obtain a PCI or an RS, and if determining that the PCI or the RS does not belong to a first grouping area in which the first location is located, determine that the grouping area in which the terminal is located is changed, and use system information of a second grouping area in which the second location is located as updated system information, or use system information mapped to a PCI or an RS corresponding to the second grouping area as updated system information; or after the terminal moves from a first location to a second location, receive a second grouping area identifier sent by a network device in a second grouping area in which the second location is located, and if determining that the received second grouping area identifier is different from a stored first grouping area identifier of a first area in which the first location is located, determine that the grouping area in which the terminal is located is changed, and use system information sent by the network device in the second grouping area corresponding to the received second grouping area identifier as updated system information, where a grouping area identifier uniquely identifies one grouping area in the hyper cell.

Optionally, when the hyper cell includes a network device that sends at least one beam, the indication information indicates whether system information of all beams is the same; and the processor 602 is further configured to: when determining, based on the indication information, that the system information of all the beams is different, update the system information if determining that a received beam is changed.

Optionally, the system information includes one or more of the following: maximum transmit power of the terminal; initial receive power of a preamble received by an access network device; a power ramp step of sending an initial access preamble by the terminal; a maximum quantity of times of retransmitting a preamble by the terminal; and an access control parameter.

Figure 7:
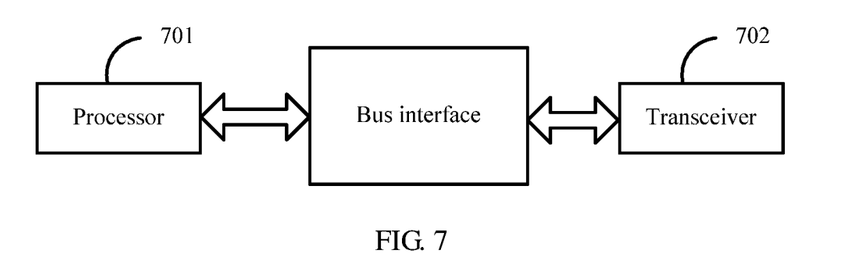
FIG. 7 is a schematic structural diagram of a system information update apparatus according to an embodiment of this application

FIG. 7 is a schematic structural diagram of a system information update apparatus according to an embodiment of this application.

Referring to FIG. 7, the apparatus includes: a processor 701, configured to generate indication information, where the indication information indicates whether system information of a hyper cell in which the first network device is located is the same; and a transceiver 702, configured to send the indication information to a terminal.

Optionally, the hyper cell includes at least one grouping area, and the grouping area includes at least one physical cell identifier PCI or reference signal RS; and the indication information indicates whether system information of all grouping areas of the hyper cell is the same.

Optionally, when the hyper cell includes a network device that sends at least one beam, the indication information indicates whether system information of all beams is the same.

Optionally, the transceiver 702 is further configured to: send a system parameter to a second network device, and receive the system information generated by the second network device based on the system parameter; or generate the system information based on the system parameter, and send the system information to the second network device.

Optionally, the system parameter includes one or more of the following: a power control parameter of the first network device; system load of the first network device; physical resource block utilization of the first network device; and channel quality feedback received by the first network device.

In FIG. 6 and FIG. 7, the transceiver may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor may be a central processing unit (CPU for short), a network processor (NP for short), or a combination of a CPU and an NP. The processor may further include a hardware chip. The hardware chip may be an application-specific integrated circuit (ASIC for short), a programmable logic device (PLD for short), or a combination thereof. The PLD may be a complex programmable logic device (CPLD for short), a field programmable gate array (FPGA for short), generic array logic (GAL for short), or any combination thereof.

A bus interface may be further included in FIG. 6 and FIG. 7. The bus interface may include any quantity of interconnected buses and bridges, and specifically links various circuits of one or more processors represented by the processor and memories represented by a memory. The bus interface may further link together various other circuits, such as a peripheral device, a voltage regulator, and a power management circuit. This is known in the art, and therefore is not further described in this specification.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the scope of this application. In this way, this application is intended to cover these modifications and variations of this application provided that they fall within the scope of protection defined by the following claims.

What is claimed is:

1. A method, comprising:
   reading and storing, by a terminal, corresponding area identifiers according to a plurality of service types supported by the terminal;
   receiving, by the terminal from a first network device, indication information and an area identifier, wherein the indication information indicates whether system information of a service area in which the first network device is located is the same; and
   determining, by the terminal based on the indication information and the area identifier, to update the system information comprising:
      updating, in response to the terminal determining that the area identifier is different from a corresponding area identifier stored by the terminal, the system information; and
      updating, in response to the terminal determining that the area identifier is the same as the corresponding area identifier stored by the terminal and that the indication information indicates that the system information of the service area in which the first network device is located is changed, the system information;
   wherein the received area identifier and the corresponding area identifier are tracking area identifiers respectively corresponding to one of the plurality of service types, and the service area is divided into a plurality of tracking areas according to the plurality of service types.

2. The method according to claim 1, wherein the system information comprises:
   maximum transmit power of the terminal;
   initial receive power of a preamble received by an access network device;
   a power ramp step of sending an initial access preamble by the terminal;
   a maximum quantity of times of retransmitting a preamble by the terminal; or
   an access control parameter.

3. The method according to claim 1, wherein the area identifier uniquely identifies one area.

4. The method according to claim 1, wherein an area in which the first network device is located comprises more than one cell.

5. The method according to claim 1, wherein the system information includes one master information block (MIB) and at least one system information block (SIB).

6. The method according to claim 1, wherein the system information includes minimum system information (Minimum SI) and other system information (Other SI).

7. An apparatus, comprising:
   a transceiver;
   a processor; and
   a non-transitory computer-readable storage medium storing a program to be executed by the processor, the program including instructions for:
   reading and storing, by the apparatus, corresponding area identifiers according to a plurality of service types supported by the apparatus;
   receiving, by the apparatus from a first network device, through the transceiver, indication information and an area identifier, wherein the indication information indicates whether system information of a service area in which the first network device is located is the same;

determining, based on the indication information and the area identifier, to update the system information comprising:

updating, in response to the apparatus determining that the area identifier is different from a corresponding area identifier stored by the apparatus, the system information; and updating, in response to the apparatus determining that the area identifier is the same as the corresponding area identifier stored by the apparatus and that the indication information indicates that the system information of the service area in which the first network device is located is changed, the system information;

wherein the received area identifier and the corresponding area identifier are tracking area, identifiers respectively corresponding to one of the plurality of service types, and the service area is divided into a plurality of tracking areas according to the plurality of service types.

8. The apparatus according to claim 7, wherein the system information comprises:

maximum transmit power of the apparatus;

initial receive power of a preamble received by an access network device;

a power ramp step of sending an initial access preamble by the apparatus;

a maximum quantity of times of retransmitting a preamble by the apparatus; or an access control parameter.

9. The apparatus according to claim 7, wherein the area identifier uniquely identifies one area.

10. The apparatus according to claim 7, wherein an area in which the first network device is located comprises more than one cell.

11. The apparatus according to claim 7, wherein the apparatus is a terminal.

12. A system, comprising:

a first apparatus; and a second apparatus;

wherein the first apparatus is configured to:

read and store, by the first apparatus, corresponding area identifiers according to a plurality of service types supported by the first apparatus;

receive, by the first apparatus from the second apparatus, indication information and an area identifier, wherein the indication information indicates whether system information of a service area in which the second apparatus is located is the same, and wherein the second apparatus is a transmission reception point of a plurality of transmission reception points within the service area corresponding to the area identifier; and determine, based on the indication information and the area identifier, to update the system information comprising:

updating, in response to the first apparatus determining that the area identifier is different from a corresponding area identifier stored by the first apparatus, the system information; and updating, in response to the first apparatus determining that the area identifier is the same as the corresponding area identifier stored by the first apparatus and that the indication information indicates that the system information of the service area in which the second apparatus is located is changed, the system information;

wherein the received area identifier and the corresponding area identifier are tracking area identifiers respectively corresponding to one of the plurality of service types, and the service area is divided into a plurality of tracking areas according to the plurality of service types.

13. The system according to claim 12, wherein the system information comprises:

maximum transmit power of the first apparatus;

initial receive power of a preamble received by an access network device;

a power ramp step of sending an initial access preamble by the first apparatus;

a maximum quantity of times of retransmitting a preamble by the first apparatus; and an access control parameter.

14. The system according to claim 12, wherein the area identifier uniquely identifies one area, and the area identifier is a service area identifier, a hyper cell identifier, or a grouping area identifier.

15. The system according to claim 12, wherein the service area in which the second apparatus is located comprises more than one cell.

16. The system according to claim 12, wherein the first apparatus is a terminal, and the second apparatus is a first network device.

17. The system according to claim 12, wherein the second apparatus is a distributed unit.

18. The system according to claim 17, wherein the distributed unit is further configured to receive, from a centralized unit, information indicating whether the system information is changed.

19. The system according to claim 12, wherein the system information includes one master information block (MIB) and at least one system information block (SIB).

20. The system according to claim 12, wherein the system information includes minimum system information (Minimum SI) and other system information (Other SI).

* * * * *